April 17, 1951     J. K. TAMBOLI     2,549,345
HYDRAULICALLY CUSHIONED AND ADJUSTABLE STEERING WHEEL
Filed Oct. 29, 1948     2 Sheets-Sheet 1
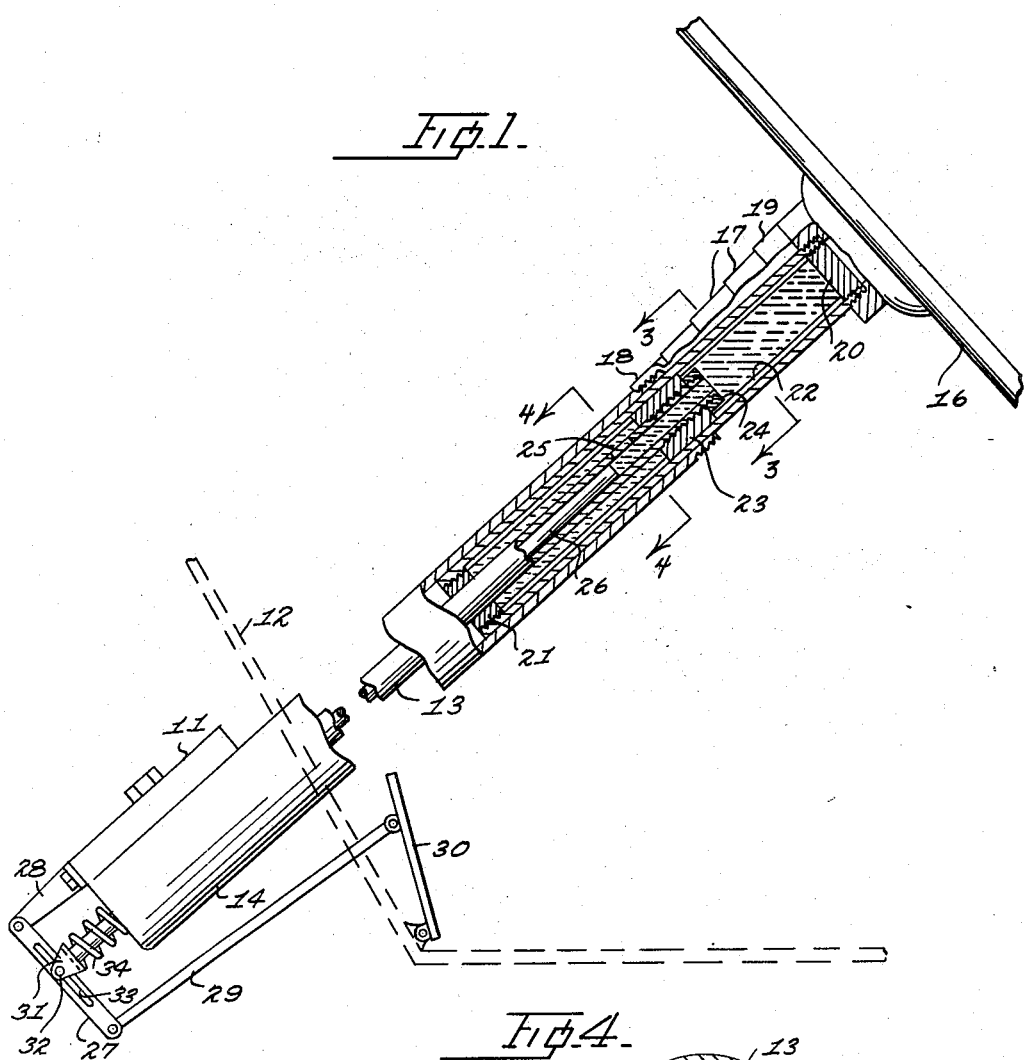
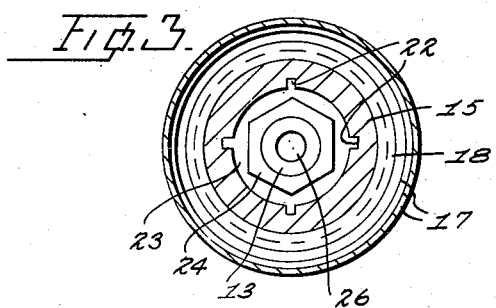
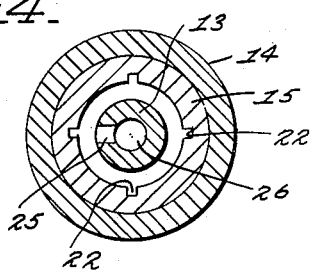
INVENTOR.
Jamshed K. Tamboli
BY
McMorrow, Berman + Davidson
ATTORNEYS April 17, 1951 J. K. TAMBOLI 2,549,345
HYDRAULICALLY CUSHIONED AND ADJUSTABLE STEERING WHEEL
Filed Oct. 29, 1948 2 Sheets-Sheet 2

INVENTOR.
Jamshed K. Tamboli
BY
McMorrow, Berman & Davidson
ATTORNEYS

Patented Apr. 17, 1951

2,549,345

UNITED STATES PATENT OFFICE 2,549,345

HYDRAULICALLY CUSHIONED AND ADJUSTABLE STEERING WHEEL

Jamshed K. Tamboli, Bombay, India

Application October 29, 1948, Serial No. 57,262

3 Claims. (Cl. 74—493)

1

This invention relates to steering mechanism for motor vehicles and more particularly to means for adjustably positioning the steering wheel of a motor vehicle and at the same time cushioning the steering wheel against vibration and shock.

A main object of the invention is to provide a novel and improved adjusting and cushioning means for motor vehicle steering wheels which is very simple in construction, easy to manipulate and yieldable in the event of collision or other emergency whereby injury to the vehicle operator by impact against the steering wheel is avoided.

A further object of the invention is to provide an improved hydraulically cushioned steering wheel for motor vehicles, which is readily adjustable to suit the requirements of individual operators, which reduces the hazards of injury to the operator, and which requires very little attention to maintain in operating condition.

Further objects and advantages of the invention will become apparent from the following description and claims, and from the accompanying drawings, wherein:

Figure 1 is a fragmentary side elevational view, partly in longitudinal cross-section, of a hydraulically cushioned and adjustable steering wheel constructed in accordance with the present invention; the release plunger of the steering wheel being shown in a depressed position whereby the wheel may be adjusted to a desired height.

Figure 2 is a view similar to Figure 1 but showing the steering wheel elements in normal positions with the wheel hydraulically locked in adjusted position.

Figure 3 is an enlarged cross-sectional view taken on line 3—3 of Figure 1.

Figure 4 is an enlarged cross-sectional view taken on line 4—4 of Figure 1.

Figure 5 is an enlarged cross-sectional view taken on line 5—5 of Figure 2.

Figure 6 is an enlarged cross-sectional view taken on line 6—6 of Figure 2.

Referring to the drawings, 11 designates a conventional steering gear mechanism, secured to the frame of a motor vehicle, not shown, in the usual manner, the floorboard of the vehicle being indicated in dotted view at 12. Designated at 13 is a tubular steering shaft which projects upwardly from the mechanism 11, the steering mechanism being actuated by rotating said tubular shaft 13, said shaft being coupled to the components of the steering mechanism in a conventional manner. Surrounding shaft 13 is the outer cylindrical steering gear jacket 14 which is rigidly fixed to the housing of the steering gear mechanism and which projects upwardly coaxially with shaft 13. Telescoped within the upper end portion of jacket 14 and rotatable and slidable therein is the cylindrical steering wheel hub member 15 to the top end of which is threadedly secured the steering wheel 16. Encircling the upper portion of hub member 15 are a plurality of telescoped sleeve segments 17, the lowermost sleeve segment, shown at 18 being threaded on the top end portion of jacket 14 and the uppermost sleeve segment, shown at 19 being secured to the steering wheel 16. The sleeve segments increase successively in diameter and have cooperating internal shoulders, which prevent said sleeve segments from separating when wheel 16 is extended to its furthest position with respect to jacket 14, yet permit the segments to telescope toward each other. Said sleeve segments are employed to exclude dirt and dust from the space adjacent hub member 15.

Threaded into the top end portion of hub member 15 is a plug 20. Threaded into the lower end portion of said hub member is a bushing 21 through which shaft 13 slidably and sealingly passes. The interior wall of hub member 15 is formed with longitudinal spline grooves 22. Designated at 23 is a splined plunger member slidably but non-rotatively fitting the inside bore of hub member 15. The upper end of shaft 13 is threaded through plunger member 23 and rigidly locked thereto by a lock nut 24 threaded on said shaft. Shaft 13 is formed below plunger member 23 with an opening 25.

Designated at 26 is a plunger rod which extends slidably through the tubular shaft 13 and projects through the lower end of jacket 14. Designated at 27 is a lever pivoted at one end to a lug 28 projecting from the housing of the steering gear mechanism 11. The other end of lever 27 is connected by a link rod 29 to a foot pedal 30 pivoted to the floorboard 12.

Rod 26 carries at its lower end a yoke 31 straddling lever 27 and provided with a transverse pin 32 connecting its arms, said pin passing slidably through a longitudinal slot 33 formed in said lever. A coil spring 34 encircles the lower end portion of rod 26, one end of said spring being secured to the bottom wall of jacket 14 and the other end being secured to yoke 31, whereby said spring biases rod 26 upwardly to the position shown in Figure 2, wherein said rod overlaps and closes off the opening 25. By depressing the foot pedal 30, the rod may be retracted downwardly against the tension of spring 34 to uncover said opening 25, as shown in Figure 1.

The interior of hub member 15 is filled with suitable hydraulic fluid, such as oil. Under normal conditions the fluid is trapped in the upper and lower spaces in hub member 15, as shown in Figure 2 and the steering wheel 16 is held in a fixed position of elevation with respect to shaft 13. Torque may be transmitted from said wheel 16 to the shaft 13, however, through the splined hub member 15 and the splined plunger 23.

The hydraulic fluid is poured into the hub 15 by removing plug 20 and the fluid runs into the annular chamber between shaft 13 and hub 15. It will be noted that opening 25 of shaft 13 is spaced from the plunger 23. When the system is being filled, an air space remains at this location, between plunger 23 and opening 25 as well as at the top of hub 15, and this would allow some compression of the air and allow the fluid from the upper part of hub 15 to pass into the lower annular space, since the air would compress to allow for the differential volume of the cylindrical space of hub 15 and the annular space between shaft 13 and hub 15.

When it is desired to adjust the height of the steering wheel, the foot pedal 30 is depressed, retracting the plunger rod 26, as shown in Figure 1, and uncovering the opening 25. Fluid is then free to flow through the upper portion of shaft 13 between the upper and lower spaces of hub member 15. With the pedal 30 depressed, the steering wheel 16 is then moved to the desired position of elevation. The pedal 30 is then released, whereby rod 26 returns to its normal position, locking the fluid in the respective upper and lower spaces in the hub member.

The trapped fluid in hub member 15 also acts as a cushioning means to absorb road shocks transmitted through the steering gear to the steering shaft 13. In the event of a collision, impact, or sudden stoppage of the vehicle, the operator is protected from serious injury by impact with the steering wheel since the force exerted by the operator as he is thrown against the steering wheel is transmitted through the fluid in the upper portion of hub member 15 to the plunger rod 26, causing said plunger rod to be depressed sufficiently to uncover opening 25. The hydraulic fluid in the upper portion of hub member 15 is then able to flow through shaft 13 to the lower portion of the hub member, allowing the steering wheel to yield to the force exerted thereon by the operator, but cushioning the operator against injury due to the initial restriction to flow imposed at opening 25.

While a specific embodiment of a hydraulically cushioned and adjustable steering wheel structure for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a steering gear unit provided with an upwardly extending tubular operating shaft, a cylindrical hub member enclosing said shaft and carrying a steering wheel secured to its upper end, the interior wall of said hub member being longitudinally splined, a plunger member secured to said shaft and slidably fitting the splined interior bore of the hub member, said shaft being formed below said plunger member with an opening, a plunger rod slidably positioned in said shaft and having an externally projecting portion, and yieldable means biasing said plunger rod to a position overlapping said opening.

2. In a motor vehicle, a steering gear unit provided with an upwardly extending rotatable tubular operating shaft, a cylindrical hub member enclosing said shaft and carrying a steering wheel secured to its upper end, the interior bore of said hub member being non-circular in cross-section, a plunger member secured to said shaft and sealingly and slidably fitting said interior bore, thereby defining respective fluid spaces in said hub member above and below said plunger member, said shaft being formed with an opening subadjacent said plunger member, a plunger rod slidably positioned in said shaft and projecting from the lower end thereof, and spring means biasing said plunger rod to a position overlapping said opening, whereby said respective fluid spaces are normally sealed off from each other but may be placed in communication with each other by moving the plunger rod axially in said shaft.

3. In a motor vehicle, a steering gear unit provided with an upwardly extending rotatable tubular operating shaft, a cylindrical hub member closed at its top end and enclosing an end of said shaft, a steering wheel secured to the top end of said hub member, a telescopic housing surrounding said shaft and hub member, the interior bore of said hub member being non-circular in cross-section, a plunger member secured to the upper end portion of said shaft and sealingly and slidably fitting said interior bore, thereby defining respective fluid spaces in said hub member above and below said plunger member, said shaft being formed with an opening communicating with the lower fluid space, a plunger rod slidably positioned in said shaft and projecting from the lower end thereof, spring means biasing the rod upwardly to a position overlapping said opening, a movable control member carried by the vehicle, and link means connecting said movable control member to the lower end of said plunger rod.

JAMSHED K. TAMBOLI.

REFERENCES CITED

The following references are of record in the file of this patent:

UNITED STATES PATENTS

| Number | Name | Date |
|---|---|---|
| 1,689,624 | Eskilson | Oct. 30, 1928 |
| 1,851,623 | Flader | Mar. 29, 1932 |
| 2,028,953 | Roark | Jan. 28, 1936 |